United States Patent [19]

Lang et al.

[11] Patent Number: 4,515,760
[45] Date of Patent: May 7, 1985

[54] NON-PRECIPITATING REGULATION OF AMMONIA CONTENT IN SOUR GAS SOLVENT SCRUBBING SYSTEMS

[75] Inventors: Roland Lang, Wolfratshausen; Heinz Karwat, Pullach, both of Fed. Rep. of Germany

[73] Assignee: Linde Aktiengesellschaft, Wiesbaden, Fed. Rep. of Germany

[21] Appl. No.: 563,839

[22] Filed: Dec. 21, 1983

[30] Foreign Application Priority Data

Dec. 23, 1982 [DE] Fed. Rep. of Germany ....... 3247876

[51] Int. Cl.³ .............................................. B01D 53/34
[52] U.S. Cl. .................................... 423/220; 423/226; 423/234; 423/236; 423/238; 423/245; 55/68
[58] Field of Search ............... 423/220, 226, 234, 236, 423/245, 238; 55/68, 73

[56] References Cited

U.S. PATENT DOCUMENTS 4,155,988  5/1979  Karwat ........................ 55/68 X

FOREIGN PATENT DOCUMENTS 3141772  4/1983  Fed. Rep. of Germany .

Primary Examiner—Earl C. Thomas
Attorney, Agent, or Firm—Millen & White

[57] ABSTRACT

The $NH_3$ content is regulated in methanol used in a process for scrubbing out sour gases from gaseous mixtures and/or for preventing ice formation prior to the scrubbing step. The methanol is freed, after the scrubbing step, respectively of absorbed gaseous components and/or water, and reused in the cycle as scrubbing liquid and/or for preventing ice formation. A strong acid is added to the methanol from water-soluble ammonium salts. Thereby, dissolved salts are formed which are removed together with water. Deleterious trace acids are also removed by an analogous treatment with a basic compound. The acid/base treatments are conducted in succession.

12 Claims, 1 Drawing Figure

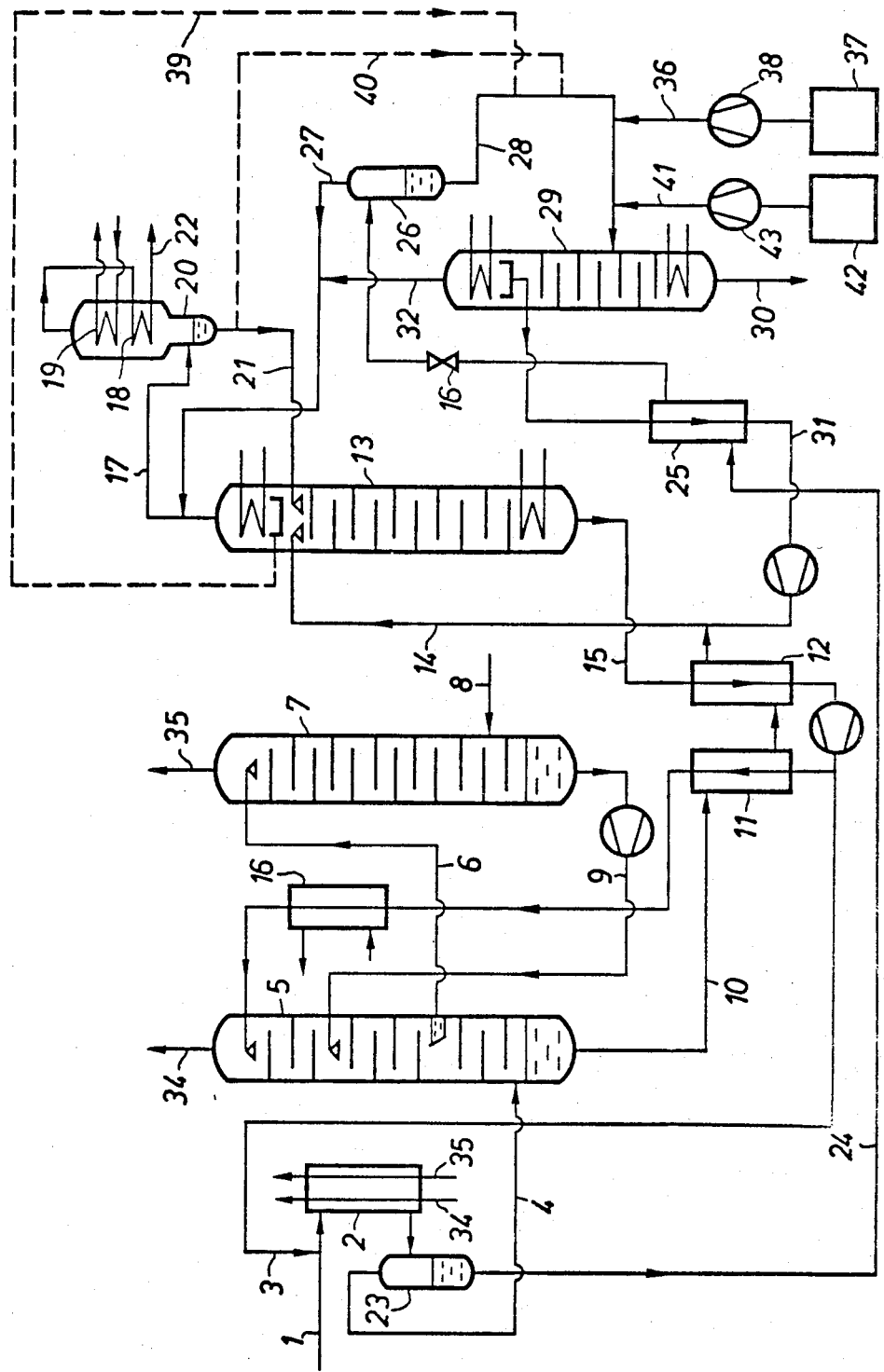

NON-PRECIPITATING REGULATION OF AMMONIA CONTENT IN SOUR GAS SOLVENT SCRUBBING SYSTEMS

BACKGROUND OF THE INVENTION

This invention relates to a system for regulating the $NH_3$-content of a physical solvent utilized in a gas absorption process for the removal of sour gases, especially carbon dioxide, from a crude gas containing minor amounts of ammonia, and in particular to preventing the precipitation of ammonium carbamate and/or a buildup of deleterious trace acids.

In the manufacture of industrial gases from crude gases, acidic components known as sour gases, especially $CO_2$ and $H_2S$, must be scrubbed out of these crude gases. Suitable scrubbing media in this connection are, for example, physical scrubbing solvents including but not limited to alcohols, glycols, and ethers. The methanol scrubbing method is especially advantageous and is of commercial significance, the acidic components being scrubbed out with methanol at temperatures of down to below $-70°$ C. and under pressures of up to 100 bar. The methanol is not only used as a circulating physical scrubbing agent, but it is also used as an anti-freeze agent to prevent moisture present in the incoming crude gas from forming ice during the precooling of the gas. The resultant anti-freeze mixture of water and methanol is then separated from the gas and thereafter separated from each other in a methanol-water separating column.

The crude gas to be purified in most cases also contains traces of ammonia which become enriched in the methanol due to the very high solubility therein. Such an enrichment with ammonia may be desirable if the ammonia content can be kept constant, i.e. there is no excessive enrichment. However, frequently ammonia enrichment in methanol progresses to such an extent that, due to the simultaneous presence of carbon dioxide, solid deposits of ammonium carbamate are formed which in turn foul heat exchangers or clog conduits. The heat balance is also impaired by the heat of reaction of $NH_3$ with the acidic gaseous components, and this disrupts the operation of the scrubbing process.

Patent application No. P 31 41 772.8 (Federal Republic of Germany,), now No. DE 3,141,772, owned by Linde, AG, the same assignee as the present invention, describes a process for the precipitation of ammonia from the scrubbing agent, e.g., methanol, with a precipitant, such as sulfuric acid. The process comprises several steps, such as metered feeding of acid, precipitation, cooling of the suspension, filtration or alternatively centrifuging, decanting or evaporation of the scrubbing medium, metered feeding of alkaline solution to buffer excess acid, transport of the filtrate to the methanol-water separating column, and a purifying cycle to remove the ammonium salt from the filter by water flushing. Owing to the number of process steps, and the apparatus involved, this process is more costly than desired.

SUMMARY

It is an object of this invention, therefore, to provide an improved process compared to the process based on precipitation of ammonia as described above.

Another object is to provide a process comprising a step for removing deleterious amounts of harmful acidic components from the solvent.

Upon further study of the specification and appended claims, further objects and advantages of this invention will become apparent to those skilled in the art.

The first mentioned object is attained according to this invention by adding an acid to the methanol to form a water-soluble ammonium salt which can be withdrawn from the scrubbing system in an aqueous phase. In contrast to the above-mentioned process according to patent application No. P 31 41 772.8, now No. D.E. 3,141,772, the process of this invention is not directed toward precipitation of an ammonium salt. Rather, the ammonia is to be removed from the circulating methanol while being "bound" to the acid, in other words in the form of a dissolved ammonium salt. Accordingly, the acid to be added must be stronger than, for example, carbonic acid or $H_2S$, in order to be able to bind ammonia. Especially suitable acids include, for example, mineral acids, such as sulfuric acid, phosphoric acid, hydrochloric acid, or nitric acid. However, in general, any acid is suitable having a $pK_a$ value of below about 3.

It is advantageous to add an acid to only a portion of the total methanol in circulation. In particular, it is especially advantageous to add an acid to the methanol before separation of the water recovered from the incoming gas, thereby forming an ammonium salt which can be transferred to the aqueous phase which is discharged from the plant. In any case, thus-formed ammonium salts, being soluble in water and to a lesser extent in water-methanol mixtures, can be removed from the methanol in a simple way.

In case it is necessary to remove an amount of ammonia greater than that contained in the methanol-water fraction from the precooling stage, a portion of the methanol used as the scrubbing liquid can be fed to the methanol-water separating stage. Preferably, the methanol is withdrawn from the head of the methanol thermal regenerating column or from the methanol cooling trap and introduced into the methanol-water mixture upstream of the spearating column. To prevent excessive enrichment of acidic components always contained in certain traces in the crude gas or formed in the methanol during the process, such as formic acid, hydrocyanic acid, thiocyanic acid, another embodiment of the process of this invention provides for removal of these acids, especially by periodic interruption of the strong acid fed to the system for the removal of ammonia. During this interruption, an alkaline compound, such as an alkali metal hydroxide, alkali metal carbonate, alkali metal bicarbonate, alkaline earth hydroxide, or alkaline earth carbonate, alkaline earth bicarbonate, can suitably be added to the methanol, in order to neutralize these acidic components.

It has been discovered that satisfactory results can be achieved by removing sufficient ammonia from the circulating methanol scrubbing agent so as to provide a concentration of ammonia in the methanol scrubbing solution, of not more than 2000 mg ammonia per kg of methanol, preferably not more than 1000 mg/kg, and in the ranges of 300–2000 mg/kg, preferably 500–1000 mg/kg.

The upper permitted limit is for formic acid 500 mg/kg, for thiocyanic acid 2000 mg/kg, and for hydrocyanic acid 500 mg/kg scrubbing solution.

Another aspect of this invention relates to an apparatus for conducting the process, said apparatus comprising a scrubbing column and at least one regenerating column, this apparatus being particularly characterized by comprising an acid container, and acid pump, and an acid feed conduit. The apparatus, in a still further aspect of this invention, includes a container for the alkaline compound, a pump therefore, and a feed conduit for the alkaline compound.

BRIEF DESCRIPTION OF DRAWINGS

In the attached drawing, the FIGURE is a schematic comprehensive preferred embodiment of the invention. Several pumps are shown, but are neither numbered nor discussed because they are of only incidental importance.

DETAILED DESCRIPTION OF PREFERRED EMBODIMENT

At 1, 90,000 Nm$^3$/h of crude gas to be purified is fed at a temperature of about 30° C. and under a pressure of 33 bar into a precooler 2. The crude gas is comprised predominantly of $H_2$ and $CO_2$, but also contains CO, $H_2S$, and 272 kg/h of water and traces of $NH_3$ (10 vppm corresponding to 0.68 kg/h). In precooler 2, the water-saturated gas is cooled to about $-20°$ C. by means of gaseous fractions withdrawn from the scrubbing stage via conduits 34 and 35, as will be described in detail below. To prevent plugging by aqueous ice, methanol withdrawn from the downstream methanol scrubbing stage is injected via conduit 3 into the crude gas prior to ice formation in precooler 2. The thus-precooled crude gas is then passed via a separator 23 and a conduit 4 into a methanol scrubbing column 5. In the scrubbing column 5, sulfur compounds along with some $CO_2$ are scrubbed out in the bottom section with a minor amount of methanol. In the middle section of the scrubbing column 5, the rough $CO_2$ scrubbing step is performed with the main quantity of methanol, and in the top section a fine purification step is conducted. In the middle section of scrubbing column 5, the scrubbing step is conducted with partially regenerated methanol, and in the top section, the process is conducted with completely regenerated methanol. The thus-purified gas is removed via conduit 34 through precooler 2 and is then used as desired.

A $CO_2$-loaded methanol stream collected in a zone above the sump of the scrubbing column is fed via conduit 6 to a regenerating column 7 and freed in this column of $CO_2$ by stripping with a stripping gas, usually obtained externally from the process, e.g., $N_2$, introduced via conduit 8, and is recycled via conduit 9 into the scrubbing column 5. The thus-liberated gases, primarily $CO_2$ and stripping gas, are removed from the head of column 7 and are forwarded via conduit 35 to the precooler 2.

The $H_2S$- and $CO_2$-containing methanol collecting as bottoms in the sump of scrubbing column 5 is conducted via conduit 10 and heat exchangers 11 and 12 into a thermal regenerating column 13. In heat exchanger 11, the methanol is heated approximately to ambient temperature, and in heat exchanger 12 to about 65° C., and is then passed via conduit 14 into regenerating column 13. In the latter, the methanol is completely freed of gases by boiling and the regenerated methanol is withdrawn from the sump of the hot regenerating column 13 via conduit 15 and cooled in heat exchanger 12 to 30° C. and in heat exchanger 11 to $-10°$ C. Most of this methanol is further cooled to about $-40°$ C. in heat exchanger 16 against a vaporizing refrigerant from a conventional refrigerating cycle and the resultant methanol is recycled to the scrubbing column 5. A minor amount of methanol bypasses the latter cooling step and is used as "anti-freeze" in conduit 3, as previously described.

The $H_2S$- and $CO_2$-fraction withdrawn in the head of the regenerating column 13 is conducted via conduit 17 into heat exchanger 18 wherein it is subjected to countercurrent cooling. This fraction is cooled to $-40°$ C. against vaporizing refrigerant in coils 19, thus condensing out any entrained methanol, the latter collecting in separator 20. The condensed entrained methanol is returned to the regenerating column 13 via conduit 21. After being warmed up countercurrently in cooling coils or the like 18, the $CO_2$- and $H_2S$-fraction leaves the installation via conduit 22.

The methanol injected into precooler 2 via conduit 3 in order to absorb water is passed into phase separator 23. The separated liquid phase of methanol and $H_2O$ is passed via conduit 24 to a countercurrent heat exchanger 25 where it is heated to ambient temperature, and it is then passed into a phase separator 26 where the main quantity of dissolved gases, especially $CO_2$, is separated by expansion in valve 16 to 2 bar.

The gases in conduit 27 are admixed with the $CO_2$- and $H_2S$-fraction withdrawn from regenerating column 13.

The methanol-water liquid mixture withdrawn from phase separator 26 is passed via conduit 28 into the methanol-water separating column 29, the reboiler being heated by steam, and the condenser being cooled by cooling water. The fractionated water is discharged via conduit 30 at the bottom, whereas the fractionated condensed methanol is withdrawn via heat exchanger 25 and conduit 31 from the head of column 29 and fed to the methanol thermal regenerating column 13. The uncondensed inert gases $CO_2$ and $H_2S$ are withdrawn from the column 29 via conduit 32.

Backtracking to the beginning of the process, ammonia entrained with the crude gas is partially dissolved in the injected methanol of the precooling stage 2 and is passed with the methanol via conduit 24 into the methanol-water separating column 29 wherein it is vaporized and is then condensed with the methanol passed via conduit 31 into the scrubbing cycle. Another portion of the ammonia, however, remains in the crude gas and in this way is passed via scrubbing column 5, together with the scrubbing methanol wherein it dissolves, likewise into the scrubbing cycle wherein it is enriched. Specifically the ammonia is passed, in correspondence with its content in the scrubbing methanol, via the thermal regenerating column 13—in the head of which an additional, local enrichment of ammonia occurs in both the gaseous and liquid phases—and via conduit 17 as a gaseous component into separator 20. The ammonia therein, if no counter measures are taken, reacts with the $CO_2$ contained in the $H_2S$-fraction evolved by thermal regeneration, thereby forming ammonium carbamate which is deposited as a solid precipitate generally first on heat exchange means 19. Thus to avoid the fouling of heat exchange means, the ammonia concentration must be limited in the scrubbing medium to a sufficiently low concentration that solid ammonium carbamate cannot be precipitated. This maximum concentration of ammonia, in this embodiment (including a safety margin) is 750 mg of $NH_3$ per liter of methanol, as measured in conduit 15 downstream of heat exchanger 12. To maintain the concentration below the maximum permissible, the present invention provides the step of adding a strong acid from a storage tank 37 by a pump 38 to the feed stream 28 to the water-methanol separating column 29 by way of conduit 36. This acid reacts with ammonia with formation of a soluble stable ammonium compound which leaves the cycle together with the water fraction via conduit 30.

In order to remove ammonia from the recycling scrubbing solution of methanol, a partial stream of methanol can be withdrawn from the head of thermal regenerating column 13 via the conduit 39, shown in dashed lines, or from the methanol cooling trap comprising conduit 17, heat exchange means 18, vaporizing refrigerant means 19, separator 20, and conduit 21, via the conduit 40, likewise shown in dashed lines, and can be fed to the methanol-water mixture in conduit 28.

To avoid an excessive enrichment in acidic components, such as, for example, formic acid, hydrocyanic acid, or thiocyanic acid in the cycle, the acid feed is periodically interrupted by stopping pump 38. During this interruption, an alkaline compound from storage tank 42 can be added to the methanol via conduit 41 by means of a pump 43. In this way, the acidic components exit from the cycle as corresponding salts, dissolved in the water fraction.

As most preferred alkaline material a sodium hydroxide solution is added.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE

Per hour, 90,000 Nm$^3$ of crude gas enters the installation at a temperature of about 30° C. and under a pressure of 33 bar, with 0.68 kg of $NH_3$ (10 vppm), 3 gram equivalents of acids, and 272 kg of water.

Additions of acid and alkali to the methanol-water separating column are alternated in intervals of respectively 12 hours, i.e. 12 hours of acid addition followed by 12 hours of alkali addition. Accordingly, it is necessary to transfer out, on the average, 1.36 kg/h of $NH_3$ during the 12 hour period of acid admixture, and, on the average, 6 g eq./h of acids during the 12 hour period of alkali admixture, i.e. respectively about twice the hourly quantity (see table).

The numbers in the table are mean values. Due to the only partial removal of $NH_3$ and acids, respectively, these compounds accumulate during the remaining time period in the large on-stream solvent phase of the process. Consequently, the $NH_3$ content in the methanol in conduit 15 downstream of heat exchanger 12 fluctuates between 720 and 750 mg of $NH_3$/l of methanol.

The acid content in the methanol rises, during the period of $NH_3$ removal, by maximally $0.12 \cdot 10^{-3}$ g eq./l methanol, but no damage to the installation can thereby occur since this acid content is buffered by an $NH_3$ content of more than 40 g mol $NH_3$/l methanol (corresponding to 720–750 mg $NH_3$/l methanol).

The pH in the wastewater in conduit 30 is maintained above 3 during the a period of acid addition. A lower pH value would indicate an unnecessary excess of acid which also could possibly be deleterious to the materials of construction.

During alkaline operation, a pH of 8–9 is maintained, which is sufficient for transferring the acidic compounds to the aqueous phase and out of the process in conduit 30.

TABLE

| | *1 | *2 | *3 | *4 | *5 | *6 | *7 | *8 |
|---|---|---|---|---|---|---|---|---|
| $CH_3OH$ | 54.5 kg/h | — | — | — | — | 300 kg/h | 354.5 kg/h | 300 kg/h |
| $H_2O$ | — | 0.8 kg/h | 1.44 kg/h | 273.5 kg/h | 272.8 kg/h | 272 kg/h | — | — |
| $NH_3$ | 0.76 kg/h | | | | | 0.60 kg/h | 0 kg/h | 0.60 kg/h |
| $CO_2 + H_2S$ | 5 kg/h (dissolved) | | | | | 213 kg/h | 218 kg/h | 212.9 kg/h |
| $H_2SO_4$ | — | 3.92 kg/h | | | | — | — | — |
| NaOH | — | 0.24 kg/h | | | | — | — | — |
| $(NH_4)_2SO_4$ | | | | 5.3 kg/h | | | | |
| Acids ($Na^+$ Salts) | | | | | | 6 g eq/h | 3 g eq/h | 3 g eq/h |
| Total | 60 kg/h | 1.04 kg/h | 5.36 kg/h | 278.8 kg/h | 273.1 kg/h | 785.6 kg/h | 572.5 kg/h | 513.5 kg/h |
| **Operating Period | 6AM–6PM | 6PM–6AM | 6AM–6PM | 6AM–6PM | 6PM–6AM | Around the Clock | 6AM–6PM | 6PM–6AM |

*1 = Condensate from separator 20,
*2 = Alkaline solution from tank 42
*3 = Acid solution from tank 37
*4 = Wastewater from column 29, conduit 30
*5 = Wastewater from column 29, conduit 30
*6 = Condensate from separator 26
*7 = Head product from column 29
*8 = Head product from column 29
**6AM-6PM acid addition
6PM-6AM alkali addition
*conduit 40

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. In a method for regulating the $NH_3$ content in methanol in a process comprising using methanol to scrub out at least $CO_2$ from a gaseous mixture containing sour gas and a trace amount of $NH_3$ and/or to prevent ice formation prior to the scrubbing step, and after the scrubbing process, separating the absorbed gaseous components and/or water from the methanol and reusing the resultant regenerated methanol in the cycle as scrubbing liquid and/or for preventing ice formation, the improvement in the method of regulating the $NH_3$ content, which comprises adding a sufficient amount of a strong acid to the methanol in order to form a water-soluble ammonium salt without precipitating any ammonium salt, transferring said water-soluble salt to an aqueous phase, and removing said aqueous phase from the scrubbing cycle.

2. A method according to claim 1, wherein said strong acid is added to only a portion of the total methanol in circulation.

3. A method according to claim 1, wherein said process comprises the use of a crude gas containing moisture, the methanol is used for preventing ice formation prior to the scrubbing step, and separating the water from the methanol prior to reuse of the latter, said acid being added to the methanol before separation of the water, transferring resultant ammonium salt to said water, and removing the water and ammonium salts from the scrubbing process.

4. A method according to claim 1, wherein the methanol is used for both scrubbing and preventing ice formation, and further comprising conducting a portion of the methanol used as the scrubbing liquid to the methanol-water separation stage.

5. A method according to claim 1, wherein the acid feed is periodically interrupted.

6. A method according to claim 5, wherein said methanol contains at least one of formic acid, hydrocyanic acid or thiocyanic acid and further comprising adding an alkaline compound to the methanol during interruption of the acid feed to form a salt of at least one formic acid, hydrocyanic acid or thiocyanic acid, transferring said salt to an aqueous phase, and removing said aqueous phase from the scrubbing process.

7. A method according to claim 6, said alkaline compound being an alkali hydroxide, alkali carbonate, alkaline earth hydroxide, or alkaline earth carbonate.

8. A method according to claim 1, wherein the regulating of the ammonia in the circulating methanol is conducted down to a residual content of not more than 2000 mg/kg.

9. A method according to claim 1, wherein the regulating of the ammonia in the circulating methanol is conducted down to a residual content of not more than 1000 mg/kg.

10. A method according to claim 1, wherein the regulating of the ammonia in the circulating methanol is conducted down to a residual content in the range of 300–2000 mg/kg.

11. A method according to claim 1, wherein the regulating of the ammonia in the circulating methanol is conducted down to a residual content in the range of 500–1000 mg/kg.

12. In a gas absorption process, using a regenerable circulating physical solvent for the removal of sour gases from a crude gas wherein said crude gas contains $CO_2$ and $NH_3$, and wherein said physical solvent prior to thermal regeneration thereof contains sufficient $CO_2$ and $NH_3$ to cause, in the absence of a counter measure, the deleterious formation of solid ammonium carbamate from vapor phase $NH_3$ and $CO_2$ withdrawn from said thermal regeneration, the improvement comprising adding a sufficient amount of a strong acid to the circulating physical solvent to bind sufficient ammonia in the form of a water-soluble ammonium salt to prevent the formation of ammonium carbamate, but without precipitating said ammonium salt in said physical solvent; transferring said ammonium salt to an aqueous phase, and removing said aqueous phase from the cycle.

* * * * *